W. C. STRANG.
ELECTRIC MOTOR CONTROL.
APPLICATION FILED APR. 4, 1913.
1,261,644.
Patented Apr. 2, 1918.
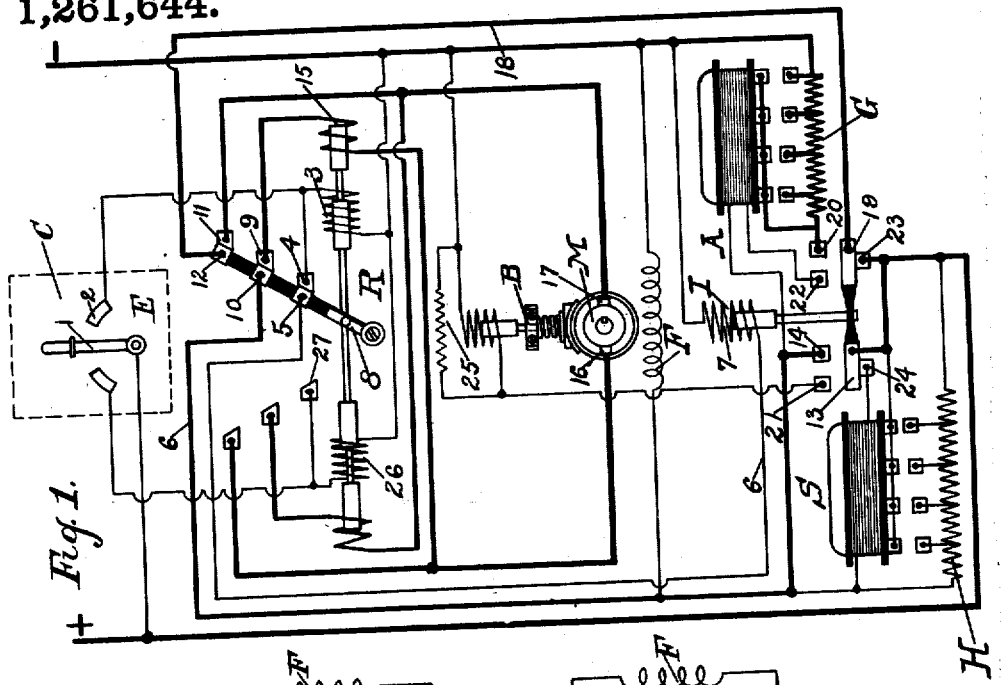
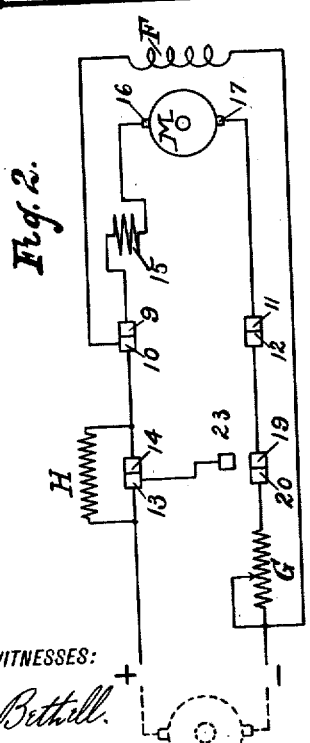
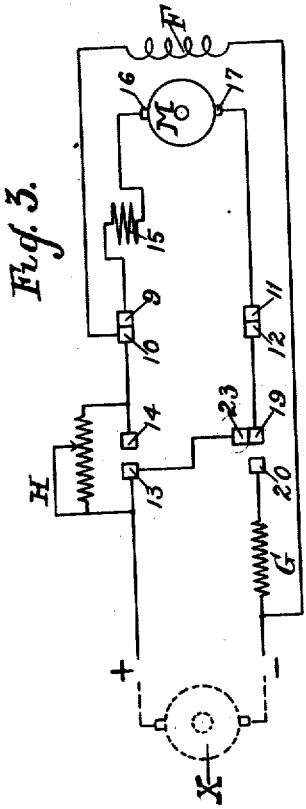
WITNESSES:
Jas. G. Bethell.
Arthur Tregise Jr.
W. C. Strang
INVENTOR
BY L. H. Campbell
ATTORNEY

UNITED STATES PATENT OFFICE.

WALTER C. STRANG, OF YONKERS, NEW YORK, ASSIGNOR TO OTIS ELEVATOR COMPANY, OF NEW YORK, N. Y., A CORPORATION OF NEW JERSEY.

ELECTRIC-MOTOR CONTROL.

1,261,644.  Specification of Letters Patent.  Patented Apr. 2, 1918.

Application filed April 4, 1913. Serial No. 758,767.

*To all whom it may concern:*

Be it known that I, WALTER C. STRANG, a citizen of the United States, residing in Yonkers, in the county of Westchester and State of New York, have invented a new and useful Improvement in Electric-Motor Control, of which the following is a specification.

My invention relates to improvements in electric motor controlling systems, and has for an object the provision of a simple and efficient system of motor control which embodies distinctively novel features of practical merit which mark a decided advance over the prior art.

A further object of the invention is the provision of improved means for slowing down and stopping an electric motor.

Other objects of the invention will appear hereinafter, the novel combinations of elements being pointed out in the annexed claims.

While the invention may be used to advantage with electric motors employed for various power purposes, the same is of particular value when used in connection with an electrically driven elevator or hoist.

It is well known that for a given motor, the greater the field strength is the less current the armature will take to produce a given torque. For this reason it is very desirable, particularly in the case of an electric elevator system, to insure a powerful field both in starting and stopping so as to cut down the armature current to a minimum thereby not only economizing current, but reducing the heating of the motor and the tendency for sparking at the motor brushes. In stopping the motor, it is almost the universal practice to utilize the current generated by the motor to effect a dynamic brake action, the field of the motor being excited from the main line or from the motor itself, acting as a self-exciting dynamo. This last named method is the one most generally in use, since it economizes current, but at the same time, it has its disadvantages in that the dynamic brake current is heavy and the field strength rapidly falls off as the speed of the motor is reduced. My invention makes it possible and desirable to use a plain shunt wound motor whose field strength not only does not fall off with reduction of motor speed but may be substantially increased over and above its normal strength and may be in certain cases practically doubled, so that the desired dynamic brake action may be obtained with but relatively small current flow in the motor armature.

Figure 1 of the accompanying drawing illustrates my invention as applied to a direct current electric elevator. Figs. 2 and 3 are wiring diagrams taken from Fig. 1 and showing the electrical circuits of the motor in starting and stopping.

Similar parts are represented by like reference characters in all of the figures.

Referring to Fig. 1, an elevator car or other load carrying device C is arranged to be operated by an electric motor M. A manual switch E may be located in the car C and controls a circuit to the reversing switch R. The latter is shown as a throw-over switch controlled by electromagnets and normally held in operated position by gravity. The usual electrically-released spring-pressed friction-brake is represented by the letter B, while F designates the motor field winding. A resistance G is used in starting the motor and is controlled by an accelerating magnet A. A resistance H is used in slowing down and stopping the motor and is controlled by a stopping magnet S. A main line switch is shown at I.

With this general description, I will now describe the various parts more in detail, and at the same time point out their operation and the electrical circuits associated therewith.

The first operation is when the lever 1 of the car switch E is brought into electrical engagement with the stationary contact 2 to close a circuit to the solenoid winding 3 of the reversing switch from the + and − mains. The switch arm 8 is thereby moved in a right hand direction into the position shown with the movable contacts 5, 10 and 12 in electrical engagement with the corresponding stationary contacts 4, 9 and 11, respectively. This operation establishes the proper armature connections corresponding to a right hand movement of the car switch, but the armature circuit is not as yet closed on the main line. As soon as the contacts 4 and 5 come together, a circuit is closed to the operating magnet 7 of the main line switch I, which circuit may be traced through the car switch, contacts 4 and 5, wire 6, winding 7, to the — main. The switch I now raises its core and connected contacts and completes the armature circuit through the starting resistance G, the motor field circuit, and a circuit to the brake. The armature circuit may be traced from the + main, through the contacts 13 and 14 of switch I, contacts 10 and 9 of the reversing switch, series coil 15, armature brush 16, motor armature brush 17, contacts 11 and 12, wire 18, contacts 19 and 20 of switch I, starting resistance G, and to the — main. The brake circuit is closed across the line at the contacts 13 and 21, and the field circuit is completed at the contacts 13 and 14. The accelerating magnet A is also connected across the motor armature at the contacts 22 and the reversing switch contacts 9, 10, 11 and 12. The motor now starts at slow speed, and as its counterelectro-motive force rises with increasing motor speed, the magnet A will automatically gradually short circuit the starting resistance and permit the motor to run up to full normal speed. The motor circuits at this time are clearly shown in Fig. 2.

It will be observed that the armature current passes through the series coil 15 of the reversing switch, and, since the core of this coil is connected to the switch lever 8, the magnetic pull of the coil 15 is effective materially to assist the action of gravity in maintaining the switch contacts in firm electrical engagement with the corresponding stationary contacts such as 4, 9 and 11.

In order to stop the motor to bring the car adjacent a floor landing, the operator moves the lever 1 of the car switch to center or "off" position. This operation immediately cuts off the current supply to the magnets 3 and 7 of the reversing and main line switches, respectively, and the switch I opens its upper contacts and establishes its lower contacts. As the switch I drops its contacts, it open circuits the brake magnet at the contact 21 and establishes a local short circuit containing the resistance H in shunt to the motor armature. This circuit may be traced from the armature brush 16, series coil 15 of the reversing switch, contacts 9 and 10, resistance H, contacts 23 and 19, wire 18, contacts 12 and 11, to the armature brush 17. The stopping magnet S is now connected through the contacts 10 and 9 with one armature brush, and through the contacts 24, 13, 23, 19 and 12 to the other brush, hence the stopping magnet will operate according to the varying potential of the motor armature gradually to short circuit more or less of the stopping resistance H to effect a dynamic brake action on the motor, tending to bring it to rest. The brake is not applied immediately its circuit is opened at the contact 21, since a high resistance 25 is connected in parallel with the brake magnet winding which receives the brake magnet discharge and thereby prevents the instantaneous application of the brake and in this manner allows sufficient time for the dynamic brake action to effect a substantial speed reduction before the friction brake is applied.

It will be observed that the current generated by the motor in stopping passes through the series coil 15 of the reversing switch, and this coil will remain energized until the speed of the motor has been substantially reduced. For this reason it becomes absolutely impossible for the operator to effect a too sudden reversal of the motor, since upon reversing the car switch with the motor at speed, the operator may energize the reversing switch solenoid 26 tending to effect a reversal of this switch, but owing to the opposing action of the series coil 15, the power of the coil 26 is not sufficient to overcome the power of the coil 15 assisted by gravity, until the motor has substantially come to rest. Since the operator cannot effect the reversal of the reversing switch until the motor has practically come to rest, he cannot operate the switch I by reversing the car switch, since the circuit to the operating magnet of the latter will be open at the reversing switch contacts 27 and 5. Therefore the dynamic brake circuit through the contacts 23 and 19 of switch I cannot be interfered with unless and until the motor has all but stopped. The motor circuits in stopping are clearly shown in Fig. 3. The operation of the system in a reverse direction is the same as already described and need not be further described, since the circuits for a reverse movement may easily be traced and are similar to those already described.

An important feature of the invention which has not as yet been described, consists in the field circuit of the motor in stopping. This circuit may best be seen by reference to Figs. 2 and 3. In these figures X designates a dynamo or other suitable source of electrical energy, which supplies current to the main line + and —. In starting the motor and during running conditions, the motor field F receives current at line potential through the contacts 13 and 14 of the main line switch I. As this switch becomes deenergized to stop the motor and before it establishes its lower contacts, or in other words, is in an intermediate position, the contacts 13 and 14 become separated and the stopping resistance H is connected in series with the motor field across the main line. Since this resistance is very low compared to the ohmic resistance of the field winding, the field strength remains substantially constant. As soon however, as the switch I has moved to extreme deënergized position with the contacts 23 and 19 in electrical engagement with each other, the field of the motor receives current at substantially double the main line potential. This fact may be seen by following the field circuit in Fig. 3. This circuit may be traced from +, contact 13, contacts 23 and 19, contacts 12 and 11, armature of motor M, coil 15, contacts 9 and 10, field F, to the — line. The motor field, motor M and generator X are therefore connected in series and the field is obviously subjected to a potential which is equal to the arithmetical sum of the potentials of the motor and generator. As the generator X assumably operates at constant potential, and the potential of the motor in stopping is substantially equal to that of the main line or generator X, depending of course on load conditions, it follows that the field excitation is substantially double and this excitation is gradually reduced as the motor reduces its speed until the motor finally comes to rest with the field at main line potential and normal strength. From the foregoing it is seen that the field strength is vastly increased over and above its normal strength during the period of stopping and hence the dynamic brake current may be reduced to a minimum and still effect a powerful braking action. Since this current may be substantially less or practically one half of what it would otherwise have to be with a field of normal strength, the heating effect is greatly reduced and all sparking at the brushes overcome.

It will be observed that in changing over the field connections, of the motor in stopping, the field circuit is never broken. The connections will always be such that the field will be in circuit with the motor and generator in series with the proper connection as to polarity, so that the field will be subjected to a potential equal to the combined potentials of the motor and generator and regardless whether the motor is being driven by the load or not.

The desirability of having a powerful field for stopping is well known and heretofore it has been the practice to employ an additional or extra field winding to effect the desired result. While it is of advantage to utilize a series field winding for starting, it is not considered good practice to use the series field in stopping due largely to the danger of a reverse current in the series field. Hence where a series field is used for starting an extra field is added to effect the stopping which means that the motor be supplied with three field windings which introduces complications in the motor and in the controlling system. My invention does away with the necessity of an extra field while enabling one to use a motor of standard construction whether the same be a simple shunt wound motor or a compound wound motor.

What I claim and desire to secure by Letters Patent of the United States is:—

1. The combination with an electric motor, of a reversing switch therefor, a main line switch adapted when in one position to close a main line circuit to the motor armature and when in another position to close a local or dynamic brake circuit around the motor armature, and means controlled by the current in said local circuit for preventing the operation of the reversing switch.

2. The combination with an electric motor, of a reversing switch therefor, a main line switch adapted when in one position to close a main line circuit to the motor armature and when in another position to close a local or dynamic brake circuit around the motor armature, and means controlled by the current in said local circuit for holding the reversing switch against movement.

3. The combination with an electric motor, of a reversing switch therefor, a main line switch adapted when in one position to close a main line circuit to the motor armature and when in another position to close a local or dynamic brake circuit around the motor armature, and a magnet winding associated with the reversing switch and in said local circuit adapted to hold the reversing switch against movement when the main line circuit to the motor armature is open and the motor is in motion.

4. The combination with an electric motor, of a main line circuit to the motor armature, and means for increasing the normal field strength of the motor by applying to the field winding a potential in excess of the main line potential while the motor is rotating and the main line circuit to the motor armature is broken.

5. The combination with an electric motor, of a main line circuit, a switch adapted to connect said circuit to the mortor armature, and circuits controlled by said switch for increasing the normal potential across the field winding of the motor upon interrupting the main line circuit to the motor armature.

6. The combination with an electric motor, of a main line circuit, and a switch in the said circuit adapted when in one position to connect the main line circuit to the motor armature and when in another position to open the main line circuit to the armature and to raise the potential across the field winding over and above the main line potential while the armature is rotating.

7. The combination with a shunt wound electric motor, a main line circuit, and means for imposing a potential higher than the line potential upon the field by connecting the motor field winding in series with the said main line and armature of the motor in stopping the motor.

8. The combination with a shunt wound electric motor, a main line, a switch for connecting the motor armature to the main line and for simultaneously disconnecting said main line and motor armature and connecting the motor field in series with the main line and the motor armature whereby the potential imposed upon the motor field is raised above the potential of the line.

9. The combination with an electric motor, of a main line circuit, and switch mechanism for increasing the potential across the field winding above that of the main line in stopping the motor.

10. The combination with a shunt wound electric motor, of a supply circuit, and switch mechanism operative upon stopping the motor for imposing a potential higher than the line potential upon the field by connecting the field of the latter in series with the motor armature and supply.

11. A shunt wound electric motor, a constant potential source of supply therefor, and means for raising the motor field excitation above that due to the said source of supply upon stopping the motor.

12. An electric motor having a shunt field, a main line circuit, and means for connecting said motor armature and motor field in parallel to said main line circuit in starting the motor and for connecting said motor armature and field in series with said main line circuit in stopping the motor.

13. An electric motor comprising a shunt field winding, a main line circuit, and means for applying a potential across said field winding equal to the combined potentials of the main line and the motor armature.

14. An electric motor comprising a shunt field winding, a main line circuit, and means for applying a potential across said field winding equal to the combined potentials of the main line and the motor armature while the latter is being brought to rest.

15. An electric motor, a field winding connected in parallel to the motor armature during the normal operation of the motor, and means for imposing a potential higher than the line potential upon the field by connecting said motor armature and field winding in series when stopping the motor.

16. An electric motor, a field winding connected in parallel to the motor armature during the normal operation of the motor, and means for imposing a potential higher than the line potential upon the field by connecting said motor armature and field winding in series with each other and in series with a source of current supply.

17. A shunt wound electric motor, a source of supply and means for imposing a potential higher than the line potential upon the field by supplying the motor field with exciting current derived from the said source of supply and the motor armature in series when the motor is acting as a generator in coming to rest.

18. An electric motor comprising a field winding, and means for connecting said winding in shunt to the motor armature in starting the motor and for imposing a potential higher than the line potential upon the field by connecting said winding in series with the motor armature in stopping the motor.

19. An electric motor comprising a field winding, means for connecting said winding in shunt to the motor armature in starting the motor and in series with the motor armature and line in stopping the motor, the circuit in said winding remaining unbroken during the change over from shunt to series relation with the motor armature.

20. An electric motor comprising a field winding, means for connecting said winding in shunt to the motor armature in starting the motor and for connecting said winding in series with the motor armature in stopping the motor, and a resistance adapted to be connected across the motor armature in stopping the motor and controlled by said means.

21. An electric motor comprising a field winding, a switch adapted for connecting said winding in shunt to the motor armature when in one position, and for connecting the said winding in series with the motor armature and line when in another position, and means for preventing the deënergization of said winding during the movement of said switch.

In testimony whereof, I have signed my name to this specification in the presence of two subscribing witnesses.

WALTER C. STRANG.

Witnesses:
 JAMES G. BETHELL,
 ARTHUR TREZISE, Jr.